United States Patent [19]

Ramaglia

[11] 4,386,967

[45] Jun. 7, 1983

[54] PRETREATMENT OF PIGMENTS

[75] Inventor: Joseph M. Ramaglia, Chicago, Ill.

[73] Assignee: Sun Chemical Corporation, New York, N.Y.

[21] Appl. No.: 310,644

[22] Filed: Oct. 13, 1981

[51] Int. Cl.$^3$ .......................... C09C 3/08; C09D 11/00
[52] U.S. Cl. .............................. 106/309; 106/288 Q; 106/288 B; 106/300; 106/304; 106/307; 106/308 F; 106/311; 523/333; 524/878
[58] Field of Search ..................... 106/308 F, 309, 300; 241/5, 21

[56] References Cited

U.S. PATENT DOCUMENTS

| | | | |
|---|---|---|---|
| 2,982,666 | 5/1961 | Chun et al. ..................... | 106/309 X |
| 3,451,834 | 6/1969 | Kerry et al. ........................ | 106/300 |
| 3,602,437 | 8/1971 | Driscoll ................................ | 241/21 |
| 3,602,438 | 8/1971 | Driscoll ................................ | 241/21 |
| 3,694,239 | 9/1972 | Simon .................................. | 106/309 |
| 3,728,142 | 4/1973 | Rudolph et al. .................... | 106/300 |
| 3,951,849 | 4/1976 | Vickery et al. .................. | 106/308 F |

FOREIGN PATENT DOCUMENTS 553534 2/1958 Canada ............................. 106/300

Primary Examiner—Helen M. McCarthy
Attorney, Agent, or Firm—Cynthia Berlow

[57] ABSTRACT

The dispersibility of dry pigments in a dispersion medium is improved by spraying the pigment before or during its addition to the medium.

4 Claims, No Drawings

PRETREATMENT OF PIGMENTS

This invention relates to pigment dispersions. More particularly it relates to the pretreatment of dry pigments to improve their dispersibility.

BACKGROUND OF THE INVENTION

In the production of inks, paints, colored plastics, and the like, an important factor is the introduction of the pigment. It is essential that the pigment be uniformly dispersed in the vehicle to assure uniform coloring. To obtain this desired uniformity, the pigment is usually ground in a dispersing agent and the resultant pigment paste is incorporated into the composition to give it the desired color, opacity, and other properties.

Many attempts have been made to improve the dispersibility of pigments. The use of the pigment in dry form has been suggested, but this has the disadvantage that powdered pigments are dusty and scatterable, bulky, and difficult to wet out. The addition of a surface active agent or other dispersant to the pigment is also not a satisfactory solution to the problem because it is difficult to obtain the required degree of dispersion.

SUMMARY OF INVENTION

The present invention provides a pigment that is quickly and readily dispersed in a liquid medium to form, for example, an ink system. This is accomplished by pretreating the dry pigment by spraying it with a wetting liquid as it is being introduced into the mixing vessel that contains the liquid medium into which the pigment is to be dispersed.

DETAILED DESCRIPTION OF THE INVENTION

Spraying a dry pigment with a solvent prior to its being introduced into the liquid medium into which it is to be dispersed results in improved dispersion, better grind, fewer mill passes, and greater color strength.

The agent with which the dry pigment is sprayed may be one of the solvents in the ink formulation, but it is not necessarily limited thereto. The spraying material may be a portion, e.g., up to about 10 weight percent of the total batch, that is withheld from the dispersion liquid and applied to the dry pigment. Suitable materials are any solvent that is compatible with the batch being sprayed.

The rate of the spray depends upon both the properties of the pigment, that is, its specific gravity, absorptivity, and the like, and the rate of pigment addition. The droplet size of the spray is preferably, but not necessarily, fine; a stream, very fine droplets, or mist tend to give less good results.

Any known and convenient means of spraying the pigment may be used. The material used as the spray, the rate at which it is applied to the dry pigment, and the size of the droplets are matters within the skill of the art and are determined individually by experimentation for each pigment and each liquid medium.

After the pigment has been sprayed, it is mixed with the dispersion medium. In order to retain the improvements that have been obtained in dispersibility and color strength, the mixing speed is kept relatively slow, the speed being dependent upon the density of the pigment that is being added. It is also important that the temperature be held relatively low, generally below about 120° F. and preferably and between about 95° and 120° F. The position of the blade on the mixer also is varied depending upon the density of the pigment.

The process of this invention is applicable to any pigment, organic or inorganic, that is used in printing inks, coating compositions, paints, plastics, or the like. Specific examples include, but are not limited to, carbon blacks, iron oxides, molybdenum red, titanium white, phthalocyanine blue, phthalocyanine green, quinacridones, lithol reds, Permanent Red, Permanent Yellow, Peacock Blue, or the like.

The liquid medium into which the pigment is dispersed is any suitable vehicle for an ink, coating, paint, or the like. It generally comprises a combination of natural or synthetic resins, such as for example polyesters, alkyds, phenolics, polyamides, cyclized rubber, petroleum resins, nitrocellulose, and polyvinyl chlorides, and a solvent, such as for example ethers, ketones, alcohols, hydrocarbons, and the like, and mixtures thereof.

After the pigment has been dispersed in the selected vehicle, the resulting material is ground by, for example, passing it through a three-roll mill as many times as are required to obtain the desired product. The milling temperature is preferably 140° F. or less.

The solvent tends to make the body of the ink longer, causing the pigment to hang back in the mill. This can be countered by the addition after the spraying procedure of a small amount of water, i.e., about 0.5 percent, which enables the pigment to flow through the mill at a more even rate.

The spraying speeds up the absorption of the pigment into the batch, cutting the required time by about 50 percent.

The invention will be illustrated by the following examples wherein all parts are by weight unless otherwise specified.

EXAMPLE 1

(A) A dispersion varnish was prepared by mixing 65 parts of polyester resin and 28 parts of tridecyl alcohol. The ingredients were mixed for 10 minutes at 500 r.p.m.

Then 350 parts of Monaco Red pigment was added to the dispersion medium over a period of 15 minutes while being sprayed with 7 parts of tridecyl alcohol at the rate of 0.5 part per minute. Mixing was continued while the pigment was being added.

Mixing was continued at 95° F. at 800 r.p.m. for 45 minutes after the addition of all the sprayed pigment. The mixture was then processed by one grinding pass on the three-roll mill and one canning pass, that is, the final pass for the ink to be milled into containers and shipped.

The product was a red printing ink.

(B) The procedure of part (A) was repeated except that 65 parts of the polyester resin and 35 parts of tridecyl alcohol were mixed to make the varnish, and the dry pigment was then added over a period of 50 minutes without spraying. Three grinding passes and one canning pass were required to obtain an ink product.

The color of the ink of part (A) was 5 percent stronger than that of part (B).

EXAMPLE 2

The procedure of parts (A) and (B) of Example 1 was repeated except that the temperature was 100° F. The color of the product of part (A) ws 8 percent stronger than that of part (B).

EXAMPLE 3

The procedure of parts (A) and (B) of Example 1 was repeated with each of the following pigments instead of Monaco Red: Peacock Blue, Fastolux Green, Permanent Red, and Permanent Yellow. The results were comparable.

EXAMPLE 4

The procedure of parts (A) and (B) of Example 1 was repeated with each of the following solvents instead of tridecyl alcohol: polypropylene glycol, butyl Carbitol acetate, Magie 470 oil (a straight run petroleum distillate boiling at 460° to 515° F.), Magie 535 oil (a straight run petroleum distillate boiling at 510° to 600° F.), MagieSol 47 (a hydrogenated petroleum middle distillate boiling at 445° to 525° F.), MagieSol 52 (a hydrogenated petroleum middle distillate boiling at 508° to 600° F.), and an acrylated varnish. The results were comparable.

EXAMPLE 5

The procedure of part (A) of Example 1 was repeated except that the pigment was sprayed with polypropylene glycol instead of tridecyl alcohol. The results were comparable.

EXAMPLE 6

The procedures of parts (A) and (B) of Example 1 were repeated with each of the following resins instead of the polyester varnish: alkyd varnish, hydrocarbon varnish, and asphaltum varnish. The results were comparable.

The pigment pretreatment process of this invention has many advantages both in reduced costs and improved quality. Since each grinding pass takes about 8 hours for a 1000-pound batch, reducing the number of grinding passes from 3 or 4 to 1 or 2 results in a considerable saving of dispersion time. Color strength increases of up to about 10 percent from the same amount of pigment have been obtained. The generation of pigment dust during both the addition and the mixing steps has been reduced to a minimum, thus lowering the amount of exposure of operating personnel to the pigment dust as well as reducing loss of pigment. The resulting inks have softer body without loss of viscosity, making them easier to handle. Batches that are sprayed require less mixing time than unsprayed batches and the wet pigment is absorbed faster into the batch. The amount of time saved depends upon the density of the pigment.

What is claimed is:

1. A pretreatment-by-spraying process for improving the dispersibility of a dry pigment in a dispersion medium which consists essentially of pretreating the pigment by spraying the pigment with at least one solvent immediately before it is added or whle it is being added to the dispersion medium, said solvent being the same as at least one of the solvents in the dispersion medium wherein said pretreatment results in substantially less mixing time over the same process absent pretreatment.

2. The process of claim 1 wherein the pigment is sprayed while it is being added to the dispersion medium.

3. The process of claim 1 wherein the solvent with which the dry pigment is sprayed is tridecyl alcohol.

4. The process of claim 1 wherein the amount of solvent with which the dry pigment is sprayed is up to about 10 percent, based on the weight of the total dispersion.

* * * * *